United States Patent [19]

Su

[11] Patent Number: 5,932,168

[45] Date of Patent: Aug. 3, 1999

[54] METHODS FOR MAKING ECOLOGICALLY COMPATIBLE WATER-BASED MULLITE SOLS AND MULLITE COMPOSITIONS

[75] Inventor: Wei-Fang Anne Su, Murrysville, Pa.

[73] Assignee: Siemens Westinghouse Power Corporation, Orlando, Fla.

[21] Appl. No.: 08/851,810

[22] Filed: May 6, 1997

Related U.S. Application Data

[63] Continuation of application No. 08/551,494, Nov. 1, 1995, abandoned.

[51] Int. Cl.$^6$ .................................................. C04B 35/185
[52] U.S. Cl. ........................... 264/621; 501/12; 501/128; 264/640; 264/643; 210/510.1
[58] Field of Search ..................... 501/12, 128; 264/621, 264/643, 640; 210/510.1

[56] References Cited

U.S. PATENT DOCUMENTS

| | | | |
|---|---|---|---|
| 4,687,652 | 8/1987 | Yoldas et al. | 501/128 |
| 4,761,323 | 8/1988 | Muhlratzer et al. | 428/198 |
| 4,849,382 | 7/1989 | Shibata et al. | 501/95 |
| 5,030,592 | 7/1991 | Komarneni et al. | 501/12 |
| 5,045,514 | 9/1991 | Ismail et al. | 501/12 |
| 5,130,110 | 7/1992 | Rouet et al. | 501/12 |
| 5,204,141 | 4/1993 | Roberts . | |
| 5,268,101 | 12/1993 | Anderson et al. | 501/12 |
| 5,338,707 | 8/1994 | Inui et al. | 501/12 |
| 5,439,624 | 8/1995 | Anderson et al. | 264/66 |
| 5,733,176 | 3/1998 | Robinson . | |

OTHER PUBLICATIONS

M.A. Alvin, T.E. Lippert and J.E. Lane, Assessment of Porous Ceramic Materials for Hot Gas Filtration Applications, Ceramic Bulletin, 70(9), 1991, p. 1491.

M.D. Sacks & H–W Lee, A Review of Powder Preparation Methods and Densification Procedures for Fabricating High Density Mullite, appearing in Mullite and Mullite.

R.K. Iler, The Chemistry of Silica (John Wiley & Sons 1979); B.E. Yoldas, Ceramic Bulletin, 54(3), 1975, 286–88 & 289–290.

C.J. Brinker & G.W. Scherer, Sol–Gel Science: The Physics and Chemistry of Sol–Gel Processing, pp. 216–223 (Academic Press, Inc. 1990).

Primary Examiner—James Derrington

[57] ABSTRACT

This invention relates to novel ecologically compatible water-based stable mullite precursor sols, mullite composites, and methods for making the same. The mullite precursor sols are synthesized using tetraethoxysilane and aluminum nitrate in water. The tetraethoxysilane is hydrolyzed with water and ammonium hydroxide catalyst to make a silica sol, which is then quenched with an aqueous solution of aluminum nitrate. The mullite precursor sols of the invention may be used to make highly densified ceramic composites.

8 Claims, 3 Drawing Sheets

METHODS FOR MAKING ECOLOGICALLY COMPATIBLE WATER-BASED MULLITE SOLS AND MULLITE COMPOSITIONS

This application is a continuation of application Ser. No. 08/551,494 filed Nov. 1, 1995, now abandoned.

BACKGROUND OF THE INVENTION

The present invention relates to novel ecologically compatible, water-based, stable mullite precursor sols, methods for making the same, and mullite composites incorporating the novel compositions of the invention. The novel compositions of the invention may be used, for example, to make ceramic filters for use in industrial applications, such as gas turbines.

Gas turbine based power plants are attractive to electrical utilities because of their low cost, high efficiency, and short lead time. Unfortunately, these turbines have been limited to operation using expensive, and sometimes scarce fuels (i.e., distilled oil and natural gas). A less expensive fuel alternative is coal, and there have been efforts to develop a gas turbine system for generating electrical power that can use coal as the fuel source. When used in such applications, the coal is usually in the form of a high temperature, high pressurized gas. However, because the coal gas tends to contain particulate matter such as alkalis and sulfur, which can be harmful to the gas turbines, it must undergo pretreatment procedures before it is used in the gas turbines. In certain pretreatment procedures, ceramic filters are used to remove particulate matter from the coal gas. See, e.g., M. A. Alvin, T. E. Lippert and J. E. Lane, *Assessment of Porous Ceramic Materials for Hot Gas Filtration Applications,* Ceramic Bulletin, 70(9), 1991, p. 1491–1498, the disclosure of which is herein incorporated by reference in its entirety. In such applications, it is required that the ceramic filters not only have thermal, chemical, and mechanical stability, but also long term structural durability. Monolithic mullite filters can provide thermal, chemical, and mechanical stability. However, they have poor resistance to crack propagation and low tolerance to damage. Generally, an oxide continuous fiber reinforced ceramic composite is required for long term durability. It is also desirable that the ceramic filters can be processed under ecologically compatible conditions, that is, the ceramic filters can be prepared from ecologically compatible starting materials such as water-based mullite sols.

Mullite exhibits exceptional structural strength and stability in corrosive and high temperature (i.e., greater than 1000° C.) environments, and thus, is a good candidate for the matrix material of ceramic composites. However, there have been problems with using mullite composites in industrial applications such as poor structural integrity of the final product due to poor density or incomplete mullitization. It is believed that these problems are due, in part, to the methodologies used in making the mullite.

Mullite has a composition of $3Al_2O_3 \cdot 2SiO_2$ and is similar to other crystalline ceramics with a high degree of covalent bonding in that relatively high temperatures are required for densification. Generally, mullite is made using conventional powder mixing techniques in which alumina and silica powder (having a particle size of approximately 1 micron) are mixed and sintered above 1600° C. However, mullite prepared using these techniques tends to contain traces of other components, such as, $\alpha\text{-}Al_2O_3$ and $\alpha$-cristobalite, which indicates that the reaction to mullite is not complete even at such high temperatures. A result of this is decreased density for compositions formed from such mullite. See, e.g., M. D. Sacks & H-W Lee, *A Review of Powder Preparation Methods and Densification Procedures for Fabricating High Density Mullite,* appearing in Mullite and Mullite Matrix Composites, Ceramic Transaction 6, 167–207 (S. Somiya, R. F. Davis, & J. A. Pask eds. 1990), the disclosures of which are herein incorporated by reference in their entirety. When used in industrial applications, it is desirable to have mullite compositions or compacts that have a high density because it enhances the structural integrity of the ceramic component (i.e., prevents cracks and brittleness) and enhances the useful life of the components.

It is also desirable to lower sintering temperatures for mullite (i.e., lower the mullitization temperature), and such attempts have been made by trying to reduce the effective particle size of the starting materials used for making the mullite powder. For example, colloid techniques, sol-gel techniques, and solution techniques, which generally operate based on precipitation principles, have been investigated. See, e.g., Sacks & Lee, supra. These methods typically use starting materials that have smaller particle sizes (i.e., less than 50 nm) and higher surface area (i.e., greater than 200 $m^2/g$), which can lead to more complete mullitization even at lower sintering temperatures. Using these methods, sintering temperatures less than about 1200° C. have been obtained. See, e.g., Sacks & Lee, supra. However, despite these various methodologies employed to make mullite powders using lower temperatures, there remains the problem of producing mullite composites also having high density.

In addition, prior art techniques for making mullite powder typically use organic solvents or organic components as part of the reaction conditions, which is ecologically undesirable. There has been a move toward trying to prepare water-based mullite sols. For example, it is known that a water-based silica sol is stable in high pH (~8) and a water-based alumina sol is stable in low pH (~2). R. K. Iler, The Chemistry of Silica (John Wiley & Sons 1979); B. E. Yoldas, Ceramic Bulletin, 54(3), 1975, 286–88 & 289–290, the disclosures of which are herein incorporated by reference in their entirety. When the alumina sol and the silica sol are mixed together, a gel or precipitation is immediately formed. The sol has to stay in a solution state in order to effectively impregnate the preform so it may be processed into a mullite composite, thus, these methods are not suitable for making mullite composites.

Water-based mullite sols have also been reported in the literature for monolith and powder preparations. See, e.g., C. J. Brinker & G. W. Scherer, Sol-Gel Science: The Physics and Chemistry of Sol-Gel Processing, p. 216–223 (Academic Press, Inc. 1990), the disclosures of which are herein incorporated by reference in their entirety. In these applications, the sol is converted to a gel in a short time (i.e., minutes to days) so a sol having months stability is not required. However, this rapid conversion to a gel makes mullite sols prepared according to this methodology poor candidates for use in impregnating preforms, which is an essential step in making mullite composites. Water-based mullite sols having sintering temperatures of about 1000° C. have been synthesized, but they contain hazardous fluoride ion and react with reinforcing preform material. Further, these mullite sols have a high exothermic phase transition from amorphous to crystalline mullite at crystallization temperatures (about 980° C.) (see FIG. 1), which is an indication that mullite composites made from the sol will have poor density characteristics.

Therefore, the mullite sol is an important factor in the success of composite processing. The sol has to be stable for easy handling and processing, it should have a high solids contents for high yield, its components should have a small particle size, it should be homogeneous, it should exhibit little or no exothermic reaction during heat treatment or densification procedures before mullitization, and should be easily converted into substantially crack-free and dense mullite composites at relatively low sintering temperatures. Also, to comply with environmental issues, the sol should preferably be water based. The present invention addresses these as well as other needs by presenting aqueous mullite precursor sols, unlike the prior art mullite powders, that can be made into mullite composites. The present invention produces stable, water-based mullite precursor sols by hydrolyzing an aqueous silane solution with a base and then adding an aqueous solution of aluminum nitrate to the solution. These stable sols can then be used to prepare the novel, inter alia, substantially crack-free and dense mullite composites of the invention.

SUMMARY OF THE INVENTION

This invention presents, inter alia, methods for preparing mullite precursor sols, mullite composites, and articles comprising the same. The mullite precursor sols are stable for up to about two months, allowing for easy handling and processing; they are capable of being easily converted into dense mullite at low temperatures; they produce high yield solids; and are water based, which makes them environmentally desirable. The mullite precursor sols of this invention provide for improved composites that may be used in such items as ceramic filters used in, for example, hot gas pretreatment procedures from coal fired power plants.

In contrast to the techniques available in the art, which focus on making mullite powders using precipitation techniques, the present invention is directed to aqueous mullite precursor sols that can be made into substantially crack-free and dense mullite composites. The processing steps of mullite composites, generally, involve: (1) impregnating mullite fiber preforms with a mullite precursor sol and drying at solution evaporation temperature to form prepregs, and then (2) sintering the prepregs at mullitization temperature to form composites.

A mullite composite of the invention may be made as follows: The mullite precursor sol is impregnated into a ceramic preform which is then used to make a composite. Using the mullite precursor sols of the invention, the mullite precursor preforms may be densified before mullitization, which is a highly desired property for making dense ceramic composites.

A factor in achieving the highly densified composites of the invention is the particle size of the silica. The particle size contributes to, inter alia, how the preform is impregnated and the control of exothermic reactions. The particle size of the silica is controlled, in part, by the presence of the aluminum salt ions. The pH of the solution, such as the ionic strength, also affects the behavior of the silica particles in the sol. Although not intending to be limited to any theory, it is believed that the silica particles are maintained at a proper size that essentially regulates their contacting rate with the aluminum particles in the sol; this minimizes the chance of exothermic reactions occurring when a mullite precursor sol is preheated or densified before mullitization. That is, using the mullite precursor sols of the invention, crystallization (mullitization) does not occur before densification. This phenomenon leads to composites that have a very high density. And at the same time, mullitization can occur at a relatively low temperature. Heretofore, these combined effects have not been achieved.

In accordance with the practice of the present invention, presented are methods for making mullite compositions comprising mixing an alkoxy silane and a base in water to form a mixture (Step A); stirring said mixture for a time sufficient to form a silica sol (Step B); adding an aqueous aluminum solution of sufficient ionic strength to keep said silica in said silica sol dispersed (Step C); and stirring said mixture for a time sufficient to form a mullite precursor sol (Step D). The methods of the invention further comprise the steps of impregnating mullite fiber preforms with a mullite precursor sol of the invention (Step E) and drying this impregnated preform to evaporate any solvents that may be present (Step F). The preform then undergoes densification (Step G), which is then followed by sintering of the preform at a temperature between about 900° C. to about 1300° C. to form a mullite composite (Step H).

In another aspect of the invention, compositions producible by the aforementioned methods are presented, as are articles incorporating the novel mullite compositions of the invention.

DETAILED DESCRIPTION OF THE INVENTION

Figure 1:
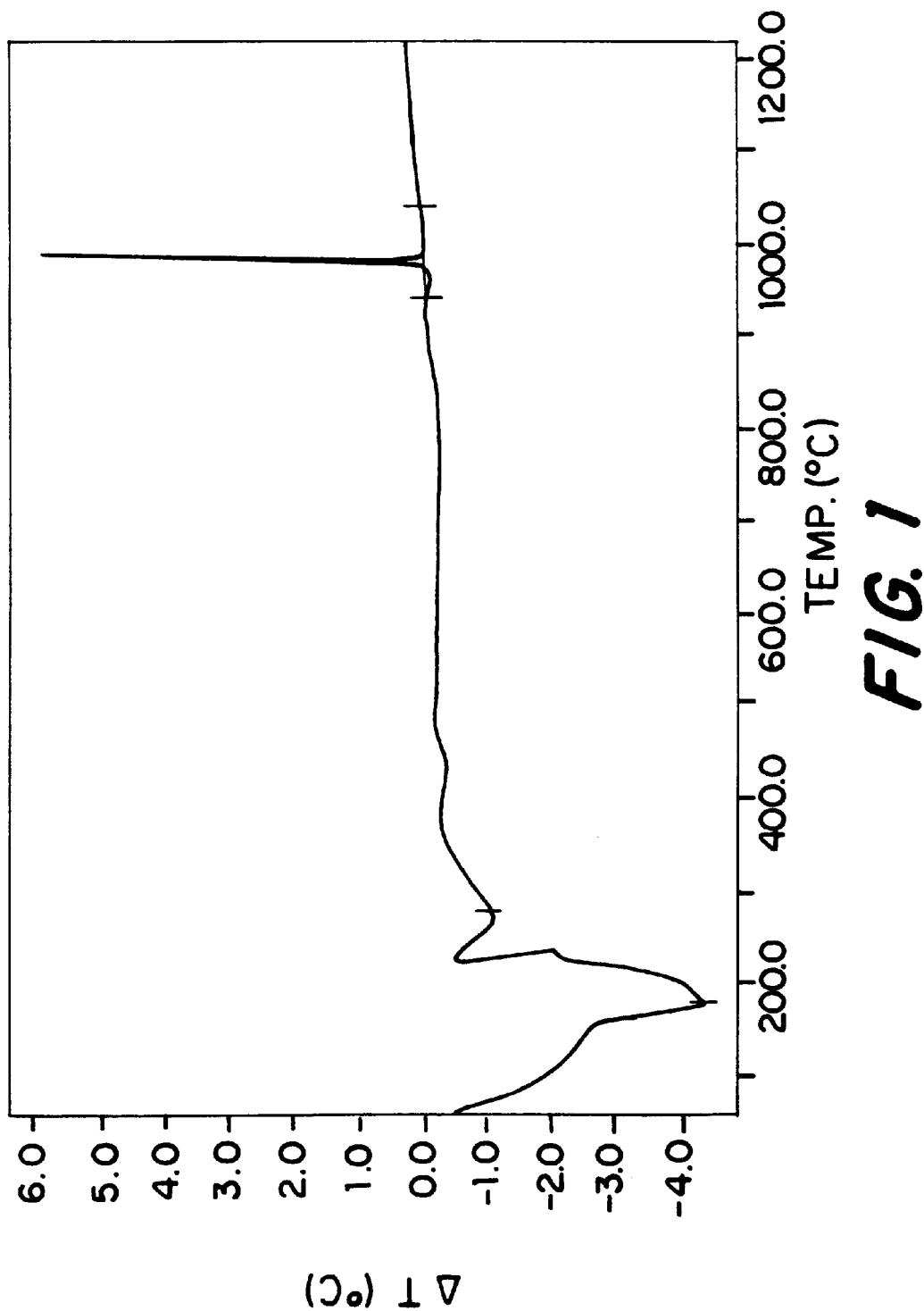
FIG. 1 is the differential thermal analysis (DTA) thermograms of the comparative sol described in Example 3.

As used herein, "mullite" refers to an orthothrombic mineral consisting of an aluminum silicate that is resistant to heat and corrosion and may be used as a refractory. It has the general formula $3Al_2O_3.2SiO_2$.

The terminology "mullite precursor," as used herein, refers to a material prepared by, for example, a colloidal technique, solution technique, or combinations thereof which is either uncalcined or calcined at a premullitization temperature.

In the context of this invention, the terminology "sol" refers to a solution which is essentially a suspension of fine particles (<50 nm particle size). "Colloidal," as used therein, refers to a dispersion where particles of a small or micro particle size are surrounded by a different medium.

The terminology "mullite compositions," as used herein, includes mullite precursor sols and mullite composites, and may be used interchangeably with these terms.

In the context of this invention, the term "preform" refers to ceramic fibers weaved into a three dimensional fiber architecture that can be impregnated with a mullite precursor sol to make ceramic composites, such as filters. As used herein, the term "prepegs" refers to the preform that is impregnated with the mullite precursor sol before the densification operation.

The term "calcine," as used herein, refers to heating a material to a high temperature without fusing, such as heating unformed ceramic materials in a kiln.

As used herein, the term "mullitization" refers to, for example, the process by which a material such as a powder or sol is converted into mullite. Mullitization occurs when the powder, sol, gel, or prepreg is sintered at a temperature at which the aluminum and silica oxides crystallize into mullite.

The terminology "room temperature," as used herein, refers to temperatures between about 18° C. to about 30° C.

The term "alkoxy," as used herein, is used in its conventional sense and refers to, generally, alkyl groups attached to a molecule through an oxygen. Alkyl groups are generally derived from an aliphatic hydrocarbon by removal of one hydrogen atom. In the context of this invention, the term "aliphatic" refers to any carbon-hydrogen containing compounds having either saturated or unsaturated bonds (alkanes, alkenes, alkynes). Such compounds may be cyclic or acyclic, straight or branched chains, and may further be substituted with hetero atoms.

The terminology "ionic strength," as used herein, refers to the measure of the electrostatic interaction among ions in an electrolyte. It is equal to half the sum of the term obtained by multiplying the molality of each ion by its valance. "Molality" refers to the concentration given in moles per one thousand grams of solvent.

Generally, the novel mullite precursor sols of the invention may be synthesized using tetraethoxysilane and aluminum nitrate in water. The tetraethoxysilane is hydrolyzed with water and an ammonium hydroxide catalyst to make a silica sol, which is then reacted with an aluminum nitrate solution to yield a mullite precursor sol. These mullite precursor sols may then be used to impregnate preforms that can then be made into mullite composites.

In a preferred method for synthesizing a mullite precursor sol of the invention, tetraethoxysilane, water, and ammonium hydroxide are mixed together (Step A) and then stirred overnight to make a silica sol (Step B). The particle size of silica is controlled in the range of less than about 100 nm using a very low concentration of ammonium hydroxide. Once the right size silica particles are formed, the silica sol is then combined with an aqueous solution of aluminum nitrate nonahydrate (Step C) and mixed overnight to make a mullite precursor sol, having a pH of less than about 2 (Step D). It is believed that the high ionic environment of the aqueous aluminum nitrate solution keeps the silica particles well dispersed and suspended steadily in the solution for a long time.

The alkoxy silane used during Step A provides, inter alia, the silica component of the mullite compositions of the invention. Alkoxy silanes suitable for use in Step A include, but are not limited to, tetraethoxysilane, tetramethoxysilane, isopropoxysilane, tetrapropoxysilane, tetra tert-butoxysilane, and tetra-n-butoxysilane, or combinations thereof, with tetraethoxysilane being preferred. Compounds comprising the above functionalities will be known to those skilled in the art and may be used without departing from the spirit of the invention.

The water and base used during Step A are responsible, inter alia, for hydrolyzing the alkoxy silane compound. The based used during Step A also acts as a catalyst for the hydrolysis of the alkoxy silane compound. It is contemplated that the water used in Step A may be, without limitation, reagent grade water, purified water, distilled water, or deionized water, preferably the water is deionized. Bases suitable for use in Step A are preferably water soluble and include, but are not limited to, ammoniumhydroxide, diethylamine, dimethylamine, N-(2-hydroxyethyl) ethylenediamine, trimethanolamine, triethanolamine, bis-(2-hydroxyethyl)butylamine, allylmethylamine, butyldimethylamine, dibutylmethylamine, 2,2',2"-trihydroxyamine, or combinations thereof, with ammonium hydroxide being preferred. Bases of the alkali metals such as sodium hydroxide are not preferable because such bases can affect the properties of the mullite. Any basic compounds meeting the requirements set forth above known to those skilled in the art may be used without departing from the spirit of the invention.

The aqueous aluminum solution used in Step C, inter alia, quenches the silica sol formed during Step B and provides the aluminum component of the mullite compositions of the invention. The presence of the aluminum salt ions tends to stabilize the solution. Essentially any aluminum salts known to those skilled in the art may be used in practicing the invention. Aqueous aluminum solutions particularly suitable for practicing Step C include, but are not limited to, aluminum chloride, aluminum bromide, aluminum fluoride, aluminum iodide, aluminum nitrate, aluminum nitrate nonahydrate, and aluminum sulfate, or combinations thereof, with aluminum nitrate nonahydrate being preferred. Phosphorous containing aluminum salts may affect the properties of the mullite.

Other materials can be included in the composition, without detracting from the spirit of the invention, such as, without limitation, calcium oxide, zirconium oxide or magnesium oxide.

The amount of the alkoxy silane used in Step A should be between about 0.5 to about 2 moles, preferably between about 0.75 to about 1.5 moles, and more preferably about 1 mole. The amount of water added to the alkoxy silane is between about 5 to about 25 moles, more preferably between about 7 to about 22 moles, and more preferably between about 10 to about 20 moles. The amount of the base catalyst used in Step A is between about 0.03 to about 0.20 moles, more preferably between about 0.04 to about 0.18 moles, and more preferably between about 0.05 to about 0.15 moles. The mixture formed during Step A is preferably stirred for at least about 17 hours, more preferably about 20 hours, and even more preferably about 24 hours. In practicing this invention, the stirring of the mixtures may be done using conventional methods.

The silica in the silica sol formed during Step B preferably has a particle size between about 50 to about 100 nm, more preferably between about 25 to about 75 nm, and more preferably between about 5 to about 50 nm. The particle size of the silica is believed to be a function of the reaction conditions, and may be determined using conventional techniques.

The amount of the aluminum salt present in the aqueous aluminum solution of Step C is preferably between about 1 to about 8 moles, more preferably between about 2 to about 6 moles, and more preferably between about 3 to about 4 moles. It is preferred that between about 15 to about 30 moles, more preferably between about 20 to about 40 moles, and more preferably between about 30 to about 50 moles of water be used for preparing the aqueous aluminum solution. In certain preferred embodiments, the molar ratio of aluminum to water in the aqueous aluminum solution will be between about 2 to about 10, more preferably between about 4 to about 30, and even more preferably between about 3 to about 20. The mixture formed during Step C is preferably stirred for at least about 17 hours, more preferably about 20 hours, and even more preferably about 24 hours. This stirring may be done using conventional methods.

A mullite sol of the invention generally has a mullite solid content of bout 20% in solution, preferably the mullite concentration is not less than about 10%. The percentage of the solids is defined as the percentage by weight of solid remaining after the solution is treated by sintering.

The mullite precursor sols formed according to the methods of the invention preferably have a pH between about 0.1 to about 5.0, more preferably between about 0.1 to about 3.0, and even more preferably less than about 1. The pH is believed to be a factor contributing to the stability of the mullite precursor sol, and is also believed to be a method of monitoring the ionic strength of the solution. The pH may be determined using conventional methods, such as a Sentron ion-specific field effect transistor (ISFET) pH meter. Any methods known to those skilled in the art for determining pH may be used without departing from the spirit of the invention.

In another aspect of the invention, mullite precursor sols producible by the aforementioned methods are presented.

Methods for making novel mullite composites are also presented. These methods comprise impregnating a mullite fiber preform with a mullite precursor sol of the invention (Step E); drying the impregnated preform to evaporate any solvents (Step F); subjecting the impregnated preform to a densification process (Step G); and then sintering the impregnated preform at a temperature between about 900° C. to about 1300° C. to form a mullite composite (Step H).

The techniques of impregnating the mullite preforms with the mullite precursor sol; and the drying, densifying, and sintering of the preforms may all be performed using conventional methods. It is preferred that the sintering temperature be between about 800° C. to about 1400° C., more preferably between about 900° C. to about 1300° C., and more preferably between about 900° C. to about 1150° C. The impregnated preform is preferably processed according to the temperature programming profile of 25–100° C. at 2° C./minute, 100° C. for 8 hours, 100–300° C. at 5° C./minute, 300° C./4 hours, 300–500° C. at 5° C./minute, 500° C. for 4 hours, 500–1150° C. at 5° C./minute, 1150° C. for 4 hours using a Thermolyne 46200 Programmable High Temperature Furnace. During the sintering, the heating rate is very important. A fast heating rate (greater than 5° C./minute) can result in deformed and/or cracked composites. The holding period at a specific temperature is also important to ensure that every stage of the sintering is completed. For example, the period of 100° C. for 8 hours is to remove all the volatiles and water in the sol. The holding period at 300° C. and 500° C. is to complete pyrolysis of the alkoxy group(s). The holding period of 1150° C. is to ensure complete mullitization. Any equipment suitable for performing such sintering may be used without departing from the spirit of the invention.

Mullite composites producible by the aforementioned methods are also within the scope of this invention, as are articles formed using the novel mullite composites of the invention.

The novel synthetic methods of the invention produce stable, and ecologically safe water-based mullite compositions. The novel mullite precursor sols of the invention are used, inter alia, to impregnate ceramic fiber preforms for advanced oxide/oxide composites suitable, for example, as gas turbine components. Test results indicate that the mullite compositions of the invention can be used to prepare green compacts with high relative density and homogeneous packing, which results in enhanced densification and less overall shrinkage during sintering. Test results also indicate that the mullite precursor preforms may be densified before mullitization, which is a highly desired property for making dense ceramic composites. Test results also indicate that the composites have high tensile strength which make them useful for, inter alia, crack-resistant, damage-tolerant, densified ceramic filters for hot gas filtration and cleaning in hot gas turbine power plants.

The novel mullite compositions of the invention are also less expensive than those made using organics, as well as being more ecologically compatible. The effluents used in forming the mullite compositions of the invention are also more readily disposable than those used in preparing organic-based mullite.

The following examples are illustrative of the invention claimed and disclosed herein and are intended only for illustrative purposes and are in no way intended to limit the scope of the invention.

EXAMPLES

General Characterization of Materials

A Perkin Elmer Thermal Analyzer 7 Series was used for differential thermal analysis (DTA). The UV spectra were obtained from a Perkin-Elmer Lambda 3B UV/VIS spectrophotometer. The viscosity was measured by a Brookfield viscometer. The pH of the sol was measured with a Sentron ion-specific field effect transistor (ISFET) pH meter. The % solids was determined by the weight difference before and after sintering the sample, using conventional methods. The X-Ray diffraction (XRD) patterns of sintered mullite powders were obtained from a Philips automated powder diffraction system, APD 3720.

Example 1

Method for Preparing a Mullite Precursor Sol

Tetraethoxysilane (TEOS) (41.7 grams), deionized water (72 grams), and ammonium hydroxide (1.05 grams) were placed in a one liter three-neck flask equipped with a stirrer, and water condenser. The mixture was stirred at room temperature for about 24 hours. A clear silica sol was formed. Aluminum nitrate nonahydrate (225.1 grams) was dissolved in deionized water (72 grams) at 40° C. in a beaker. The aqueous aluminum nitrate solution was poured into the silica sol and mixed well for about 24 hours at room temperature. A 10% solid mullite sol was prepared. The pH of the mullite precursor sol was less than 2.

The best supplier for TEOS is Fisher Scientific Company, for aluminum nitrate nonahydrate is Aldrich, and for ammonium hydroxide is Baker. The TEOS has to be kept dry in a sealed bottle to prevent hydrolysis. The aluminum nitrate nonahydrate has to be fresh (less than a half of year storage) because aged aluminum nitrate contains the decomposition product of nitric acid which reduces the pH and thus the stability of the sols. Viscosity, pH, UV absorbance, % solids, and sintering temperature of the sols have been used to control the quality of the sols. Table 3 lists the results of the measurements. As seen, the pH value is the most sensitive indicator of the stability of the sols. Product specifications were defined according to the quality control results and they are listed in Table 4.

Example 2

Method for Preparing Mullite Powder

The sol from Example 1 was dried into a powder at 100° C. The powder was then sintered into mullite at 1150° C. for about 4 hours.

Figures 2A, 2B, 2C:
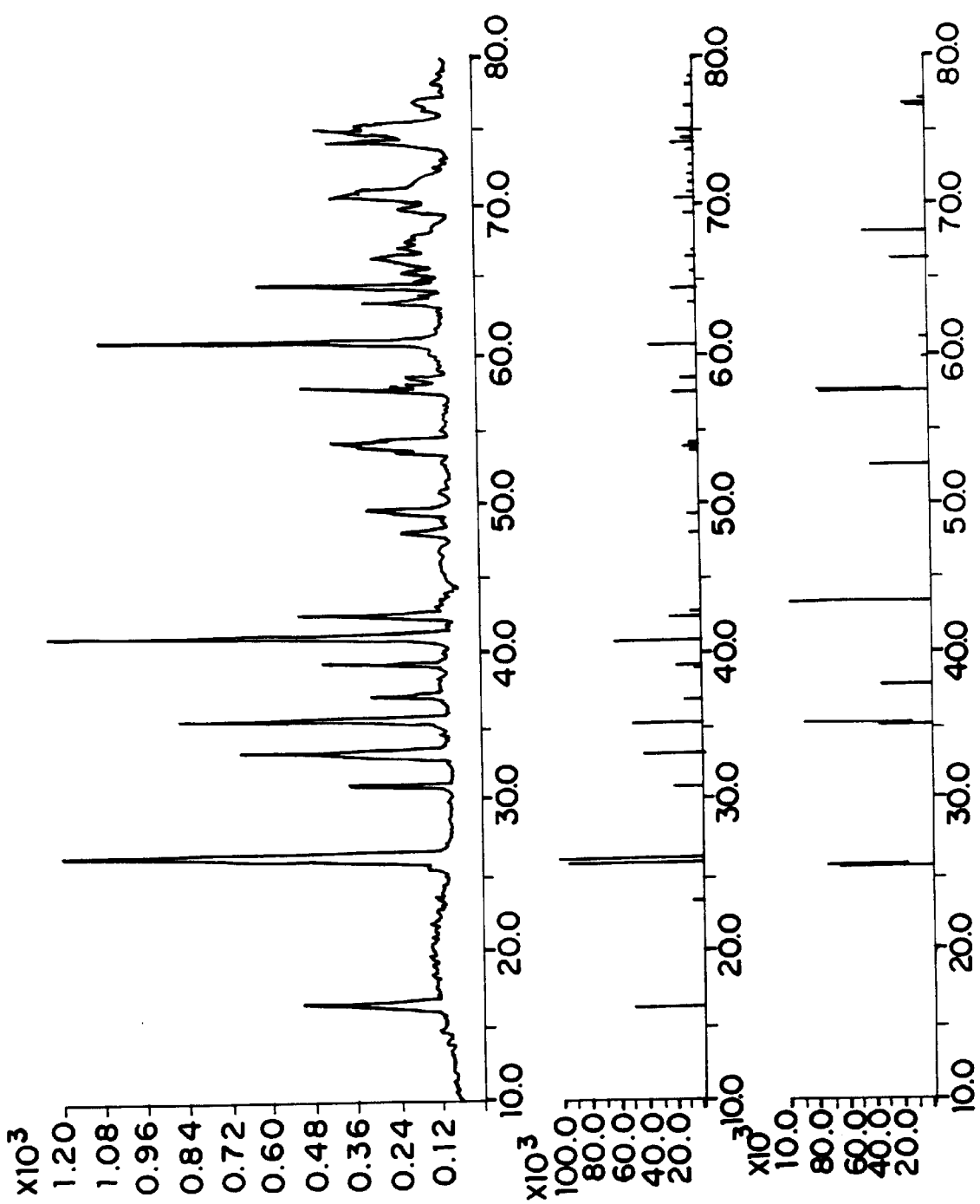
FIG. 2A depicts the x-ray diffraction pattern of the dried mullite composition described in Example 1.
FIGS. 2B and 2C, are the known x-ray patterns of mullite and alumina respectively.
Figure 3:
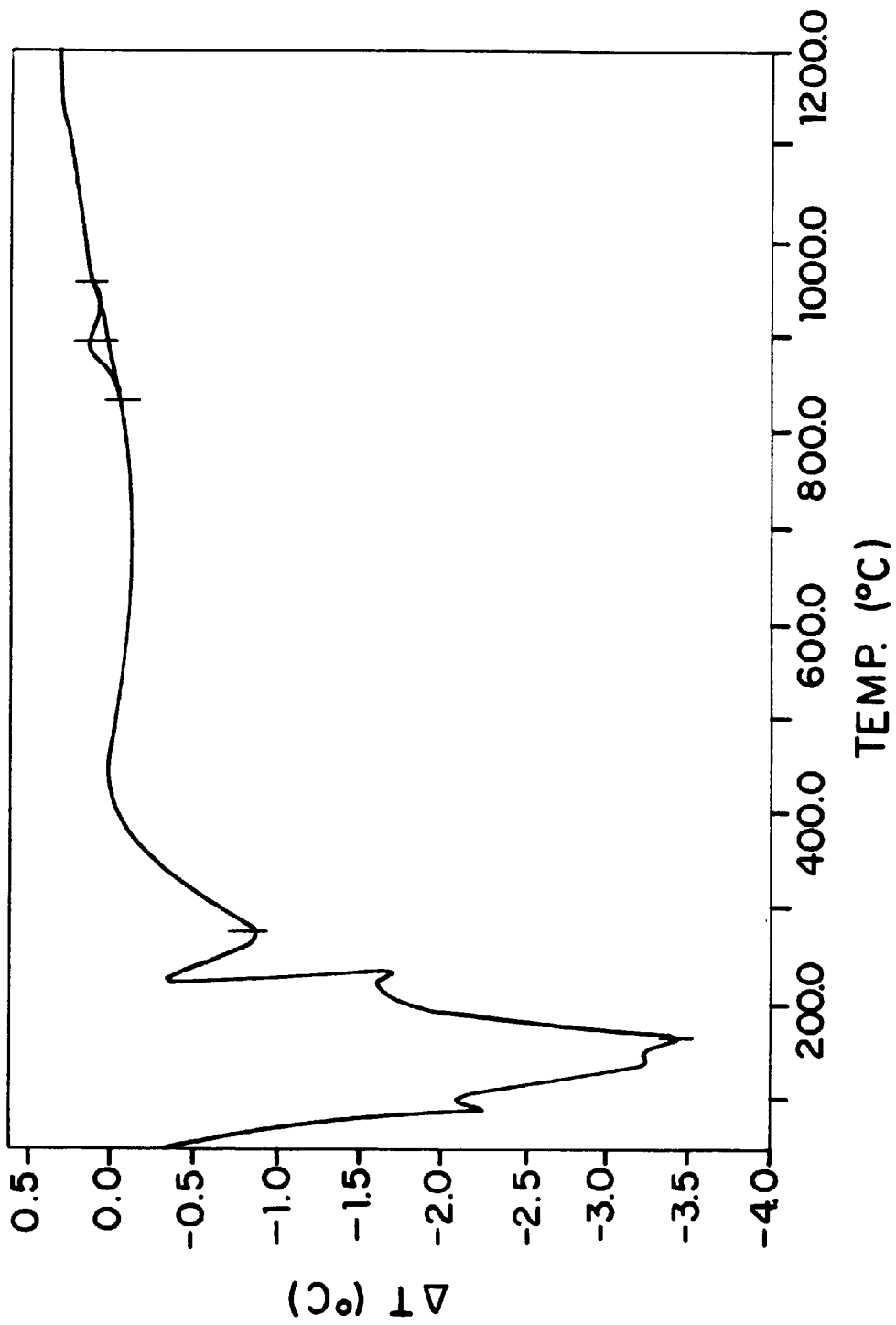
FIG. 3 is a differential thermal analysis (DTA) thermogram of the dried mullite composition described in Example 2.

The mullite structure of sintered powder was confirmed by X-ray diffraction analysis (FIG. 2). The differential thermal analysis (DTA) of dried powder revealed a small exothermic reaction at 892° C. (FIG. 3).

Example 3

Preparation of Tensile Strength Samples

The tensile strength samples were prepared by impregnating fiber preforms first with sol, described in Example 1, then with sol containing Cerac mullite powder. Half of the samples were fired at 1050° C. and the other half at 1150° C. in air for 2 hours.

The comparative samples were prepared using commercial available water-base mullite sol.

TABLE 1

Tensile Strength Test Results of Mullite Composites

| | Tensile Strength (psi)* of Sample Prepared at | |
|---|---|---|
| Sol Type | 1050° C. | 1150° C. |
| Comparative Sample | 955 | 877 |
| Sol of Invention | 2394 | 1670 |

*Tensile strength for 1050° C. is an average of 5 samples; tensile strength for 1150° C. is an average of 6 samples. Tensile strength was determined using conventional methods.

Table 1 shows that the composite samples made from the sols of the invention exhibited higher tensile strengths than those of comparative sols. The observations are in agreement with the low exothermic crystallization behavior of the sols of the invention.

Example 4

Effects of Concentration of Reactants and Catalysts on Sol Stability

Part 1 of the formulation (Table 2 below) refers to the mixture formed from mixing the tetraethoxysilane and ammonium hydroxide and Part 2 of the formulation (Table 2 below) refers to the aluminum nitrate aqueous solution. Unlike the prior art methodologies that teach that the presence of water should be minimized when preparing mullite precursors and that base addition should not occur during the early stages of mullite synthesis, the present invention uses water and base to achieve products that have better stability than those presently known in the art.

TABLE 2

| | Mole Ratios of Components in | | | STABILITY |
|---|---|---|---|---|
| | Part 1 Formulation | | Part 2 Formulation | |
| Formulation | $TEOS/H_2O$ | $NH_4OH/TEOS$ | $Al(NO_3)_3 9H_2O/H_2O$ | (days) |
| 111094 | 1/20 | 0.0450/1 | 3/20 | 59–67 |
| 111694 | 1/10 | 0.0225/1 | 3/10 | <7 |
| 111894 | 1/10 | 0.0450/1 | 3/10 | <7 |
| 113094 | 1/20 | 0.0450/1 | 3.1/20 | 60–76 |
| 121094 | 1/10 | 0.0225/1 | 3.1/20 | >11 |
| 042695 | 1/70 | 0.0450/1 | 3.1/70 | 60 |

Formulations 111094, 113094, and 042695 that contained more water than the other formulations have the best stability (sol stays in solution) (~2 months). From an economic point of view, it is desirable to have the highest possible concentration sols for high yield of oxide from the solution to minimize the number of processing steps in the manufacture of composites. However, the maximum concentration is limited by the solubility of the reactants in water. High concentrations of reactants also decrease the sol stability due to the imbalance of ionic strength of sols. The concentration of ammonium hydroxide is believed to affect the stability of the silica sol, because the high concentration of catalyst can cause precipitates of large size silica particles. As shown in Table 2, Formulation 111094 contains the maximum TEOS and ammonium hydroxide concentrations to give a stable sol. The maximum mole ratio of aluminum nitrate nonahydrate to water is in the range between about 3:10 to 3.1:20.

TABLE 3

Quality Control Data For Formulation 113094

| Formulation | pH | UV Abs. at 370 nm | Brookfield Viscosity (cps/25° C.) | % Solid at 1150° C. | Sintering Temp (° C.) (X-Ray) | Stability (days) |
|---|---|---|---|---|---|---|
| 113094B | — | 0 | — | 10.51 | 1200 | 60 |
| 113094C | — | 0 | — | 11.97 | 1150 | >11 |
| 113094D | 0.4 | 0 | 20 | 10.4 | 1150 | >40 |
| 113094E | 0.4 | 0 | 22.5 | 10.48 | 1150 | 68 |
| 113094F | 0.6 | 0 | 28 | 10.35 | 1150 | >28 |
| 113094G | 0.2 | 0 | 22 | 10.52 | 1150 | — |
| 113094H | 0.2 | 0 | 22 | 10.4 | 1150 | — |
| 113094I | 0.2 | 0 | 22 | 10.46 | 1150 | — |
| 113094J | 0.6 | 0 | 21.85 | 10.46 | 1150 | >25 |
| 113094K | 0.3 | 0 | 24.5 | 10.29 | 1150 | >20 |
| 113094L | 0.4 | 0 | 25 | 10.59 | 1150 | — |
| 113094M | 0.3 | 0 | 24 | 10.5 | 1150 | 60 |
| 113094N | <0.0 | 0 | 25.5 | 10.2 | 1150 | ~14 |
| 113094O | <0.0 | small | — | 10.4 | 1150 | ~14 |
| 113094P | 0.5 | 0 | 26 | 10.5 | 1150 | ~21 |
| 113094Q | 0.7 | 0 | 25 | 10.5 | 1150 | >14 |

TABLE 4

Product Specifications For Water-Based Mullite Sols

| Property | Specification |
|---|---|
| pH | 0.2–0.7 |
| UV absorbance at 370 nm | <0.003 |
| Viscosity (cps/25° C.) | 20–26 |
| % Solids | 10.2–10.6 |
| Sintering Temperature (° C.) | 1150 |

I claim:

1. A method of making a mullite ceramic filter comprising:
   a) mixing about 0.5 to 2 moles of an alkoxy silane, 5 to 25 moles of water and 0.03 to 0.2 moles of a base to form a mixture;
   b) stirring said mixture (a) for a time sufficient to form a silica sol, where the particle size of the silica in the sol is maintained at less than about 100 nm;
   c) adding an effective amount of an aqueous aluminum solution of sufficient ionic strength to keep said silica in said silica sol dispersed;
   d) stirring said mixture (c) for a time sufficient to form a mullite precursor sol having a ph of between 0.1 and 3;
   e) impregnating mullite fiber preforms with the mullite precursor sol of step d);
   f) drying said impregnated preform for a time sufficient to evaporate the water solvent to form a prepreg;
   g) densifying said prepreg; and
   h) heating and then sintering said prepreg at a temperature between about 900° C. to about 1300° C., reaching at least 1150° C., to form a mullite ceramic filter, at a heating rate starting at 25° C. of no greater than about 5° C./minute.

2. The method of claim 1 wherein said particle size of said silica is maintained at less than about 50 nm during step (b).

3. The method of claim 1 wherein said alkoxy silane is selected from the group consisting of tetraethoxysilane, tetramethoxysilane, isopropoxysilane, tetrapropoxysilane, tetra tert-butoxysilane, tetra-n-butoxysilane, and combinations thereof.

4. The method of claim 1 wherein said base is selected from the group consisting of ammonium hydroxide, diethylamine, dimethylamine, N-(2-hydroxyethyl)ethylenediamine, trimethanolamine, triethanolamine, bis-(2-hydroxyethyl)butylamine, allylmethylamine, butyldimethylamine, dibutylmethylamine, 2,2',2"-trihydroxyamine, and combinations thereof.

5. The method of claim 1 wherein said aluminum solution comprises an aluminum salt selected from the group consisting of aluminum chloride, aluminum bromide, aluminum fluoride, aluminum iodide, aluminum nitrate, aluminum nitrate nonahydrate, aluminum sulfate, and combinations thereof.

6. The method of claim 1 wherein said alkoxy silane of step (a) is tetraethoxysilane and said mixture contains about 1 mole of said tetraethoxysilane; said base of step (a) is ammonium hydroxide and said mixture contains between about 0.05 to about 0.15 moles of said ammonium hydroxide; said aqueous aluminum solution of step (c) is aluminum nitrate nonahydrate, having a molar ratio of aluminum to water of about 3 to about 20; and said sintering temperature of step (h) is about 1150° C.

7. The method of claim 1, where, during heating prior to sintering in step h) the prepreg is held at a temperature of about 100° C. for a time effective to remove volatiles, and then at one or both of about 300° C. and about 500° C. for a time effective to complete a pyrolysis process, and then at about 1150° C. for a time effective to complete mullitization.

8. The method of claim 1, where the heating step h) is performed according to a temperature profile of:
   i) 25° C.–100° C. at 2° C./minute and then
   ii) hold at about 100° C. for about 8 hours, and then
   iii) 100° C.–300° C. at 5° C./minute, and then
   iv) hold at about 300° C. for about 4 hours, and then
   v) 300°–500° C. at 5° C./minute, and then
   vi) hold at about 500° C. for about 4 hours, and then
   vii) 500° C.–1150° C. at 5° C./minute and then;
   viii) hold at about 1150° C. for about 4 hours.

* * * * *